May 22, 1928.

W. P. HENRY

VESSEL CLOSURE

Filed Dec. 30, 1925

1,670,450

INVENTOR.
W. P. Henry.
BY J. S. Newton
ATTORNEY.

Patented May 22, 1928.

1,670,450

UNITED STATES PATENT OFFICE.

WILLIAM PATRICK HENRY, OF NEW YORK, N. Y.

VESSEL CLOSURE.

Application filed December 30, 1925. Serial No. 78,453.

This invention relates to a vessel closure and has for its object the provision of a closure economical to construct and that will guarantee to the user of the contents of the vessel that the vessel has not been opened since the closure was put on at the place where the contents were inserted in the vessel.

Another object of the invention is to provide such a closure made of fibrous material throughout which may be cut and stamped to form by a suitable machine at a minimum of cost, both in material and in the process of stamping and fastening the parts together.

Another object of the invention is to provide a closure that will be sanitary by protecting the upper part of the vessel top beyond the closure proper both interiorly and exteriorly where the contents of the vesssel would come in contact with the upper edge of the vessel neck when it is poured out.

With these and other objects in view, which will be apparent as the specification proceeds, I will now describe my invention in connection with the attached drawings in which.

Figure 1:
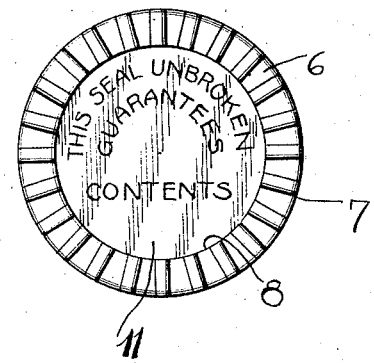
Figure 1 is a top plan view of my improved closure.
Figure 3:
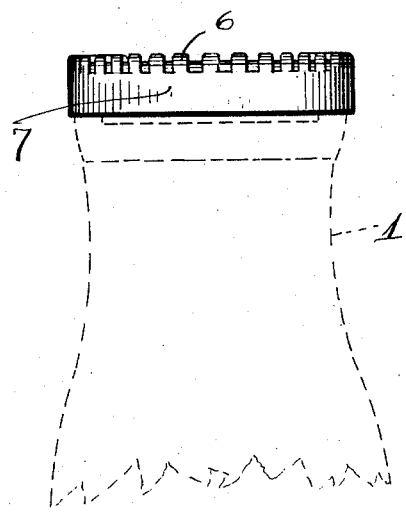
Fig. 3 is a side view of a portion of a bottle and my improved closure.

1 represents a vessel usually a milk bottle having an ordinary beaded top 2, and 3 represents an ordinary closure for the vessel 1.

As is well known this well known closure 3 as heretofore constructed, fits snugly on a seat 4 and is ordinarily provided with an extractor or other means 5 under which a sharp instrument or one's finger nail may be inserted to pull the closure 3 out of the vessel to open the vessel.

Figure 2:
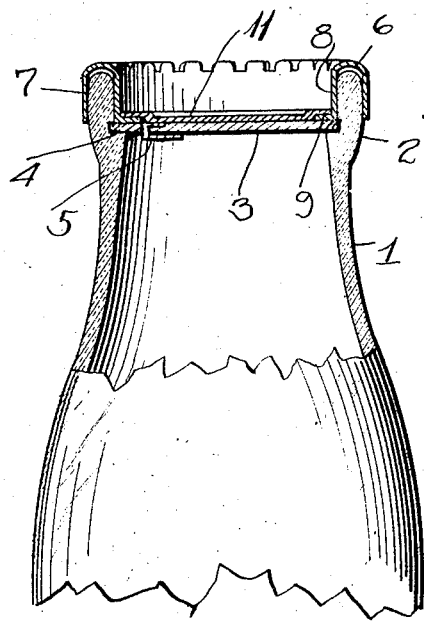
Fig. 2 is a sectional view of the closure attached to an ordinary milk bottle.
Figure 4:
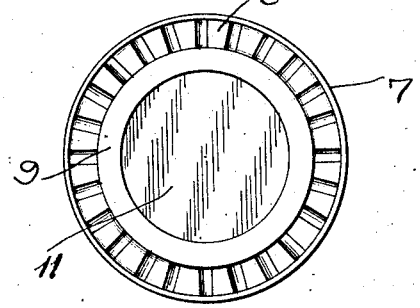
Fig. 4 is a bottom view of my improved closure, with the ordinary vessel closure left off.

It is well known that dishonest milk handlers sometimes remove the ordinary milk bottle closure 3 and part of the contents of the jar 1 and replace it with water or an inferior grade of milk, and to prevent tampering with the milk after it has been inserted in the jar, I provide a hood-shaped portion 6 usually made of strong pasteboard or similar fibrous material, crimped and pressed into the shape best shown in Fig. 2, that is to say, this hood-shaped portion 6 comprises an outside downwardly extending portion 7 to fit over the bead of the vessel, an inside portion 8, and I additionally provide a ledge 9 best shown in Figs. 2 and 4 at the bottom of the portion 8 by bending the material inwardly and crimping the same. All this hood portion of my improved closure may be pressed and shaped from a single piece of fibrous material such as thick paper or pasteboard by crimping the same as shown and bending over the outer portion marked 7 and the ledge marked 9, and it is an important part of my invention that I have discovered this part of my closure may be rapidly and satisfactorily made from cheap material simply by stamping, bending and crimping the parts to the shape shown in the drawings.

After the hood portion 6 has been made as described, there is inserted in it a round disk or diaphragm 11 of thin paper, the outer periphery of which rests on the ledge 9, and may fit snugly inside the hood portion 6. The ledge 9 being quite thin, the disk 11 when resting on the ledge 9 may be easily slightly bent downwardly as shown in Fig. 2 and glued to the ordinary closure 3 throughout the top area of the closure not covered by the ledge 9. It is possible to attach the disk or diaphragm 11 to the closure 3 in other ways, but I prefer to glue the same to the closure 3.

It will be observed that after the closure 3 has been cut to its proper size and the hood 6 pressed into shape that these parts may be assembled with the ledge 9 resting on the closure and the disk 11 pressed to the position shown in Fig. 2 and the parts glued in such a manner that they will form an integral closure self-sustaining and which may be handled as an integral unit and applied to the vessel when desired, by simply pressing on the hood 6 or the disk 11 until the closure 3 has been forced to its seat to close the vessel and the hood portion fit securely over the bead on the top of the vessel.

After my improved cover has been forced to position on a vessel, the cap cannot be removed without tearing the disk 11 because the closure 3 fits snugly on the seat 4, and should any one attempt to pull off the hood 6 after the closure has been once firmly attached to the vessel, he would rupture the disk 11 which is ordinarily made of thin fragile material so that if the disk 11 has been so ruptured, the ultimate user will know that someone has tampered with the bottle closure.

I ordinarily print a guarantee caution on the diaphragm 11 as shown in Fig. 1 to the effect that "This seal unbroken guarantees contents" or some similar expression.

It will be observed from the disclosure that my improved vessel closure may be made from paper or pasteboard and paper and after the parts are cut and stamped as heretofore described, they may be assembled. and the diaphragm 11 when glued to the comparatively thick closure 3 and to the ledge 9, the parts will be held together so that they may be handled as an integral unit and applied to close the vessel at one operation by simply pressing the parts down into place over the mouth of the vessel and when so located, the closure 3 will be firmly held on the seat 4, the hood portion 6 will fit over the upper edges of the vessel and protect the same from dirt, and dust or from coming in contact with the hand of a person handling the vessel. Moreover, the diaphragm 11 fitting snugly in the hood 6 and being glued to the hood and the closure 3, will assist in preventing any material from the outside getting into the vessel or the contents of the vessel from possibly escaping from the vessel.

It will moreover be observed that since the diaphragm may be glued to the closure 3 throughout the top area of the closure 3 except what is covered by the ledge 9, and since the diaphragm 11 may also be glued to the top of the ledge 9, the parts are held in self-supporting position and keep the cap as a whole in a position to be readily handled and applied to close the vessel, but that the diaphragm 11 being quite fragile will be ruptured and destroyed in opening the bottle or in order to reach the extractor 5.

It will furthermore be observed that the ledge 9 of the hood 6 rests firmly around the periphery of the closure 3 and by pressing on the hood 6, this pressure is transmitted through the ledge 9 to around the periphery of the closure 3 and facilitates the pressure of the cover 3 to its home on the seat 4, and insures its proper and snug placement in the groove formed by the angle in the mouth of the bottle. The material of the diaphragm is of sufficient strength to hold the disc closure 3 in position during the process of closing the filled bottle and, under pressure exerted through the inside portion 8, insure its seating in the groove 4. If for any reason it should be desirable to omit the diaphragm the closure 3 may be glued direct to ledge 9, which may be extended more or less as may be desired.

What I claim is:

1. A vessel closure comprising a closure proper to fit on a seat on the interior and near the vessel top with its periphery in contact with the inner wall of the vessel, a hood to fit over the lip of the vessel top and having its bottom portion resting on and attached to the top of said closure, and a diaphragm snugly fitting the interior of the hood and glued throughout its lower surface to the bottom of the hood and to the top of said closure.

2. A vessel closure consisting of a portion comprising a closure proper of comparatively thick material adapted to fit snugly and contact with the interior of the vessel, and to be held therein to resist outward movement, and a second portion comprising a hood shaped to fit over the lip on said vessel, said hood portion extending down into the neck of the vessel in contact with its inner wall and also having a ledge at its bottom, and a thin diaphragm fitting over the ledge and glued to the top of said cover.

3. A vessel cover comprising a stiff disk adapted to snugly fit into the neck of the vessel and to be held thereby from outward movement, a hood of paper pressed to form an outwardly extending portion to fit over the top of the bead on the vessel, said hood having a ledge adapted to fit around the top side close to the periphery of said cover and a thin diaphragm of paper firmly attached to the top of said cover and snugly fitting on the interior of said hood on top of its inwardly extending ledge and being glued thereto.

4. A vessel closure comprising a closure proper of stiff pasteboard shaped to fit on the interior of the neck of the vessel and to be held thereby from outward movement, a hood comprising a crimped cap shaped to fit the lip on the mouth of the vessel and extending down close to the wall of the neck of the vessel and fit around and attached to the upper surface close to the periphery of the closure, a thin diaphragm of fragile material that may be readily torn attached with adhesive to the top of the closure proper and to said hood to hold the hood onto the bottle lip by the hold of the closure in the neck of the bottle.

In testimony whereof I affix my signature.

WILLIAM PATRICK HENRY.